Nov. 10, 1936.   C. E. HAGLER   2,060,305
MECHANISM FOR THE CONTROL OF FEED TO COTTON EXTRACTORS
Filed Oct. 6, 1934   2 Sheets-Sheet 1
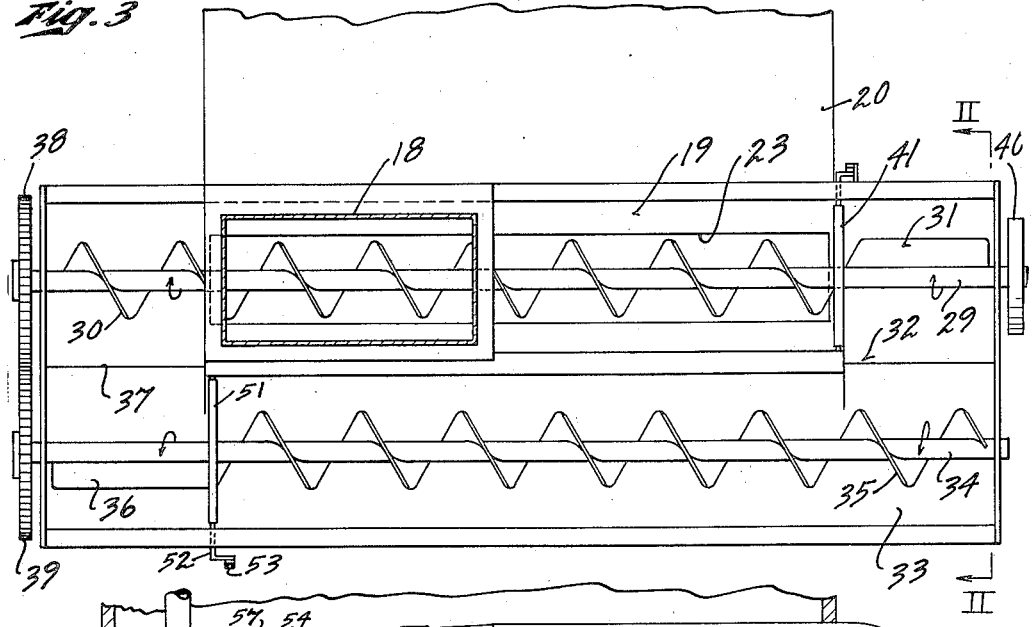
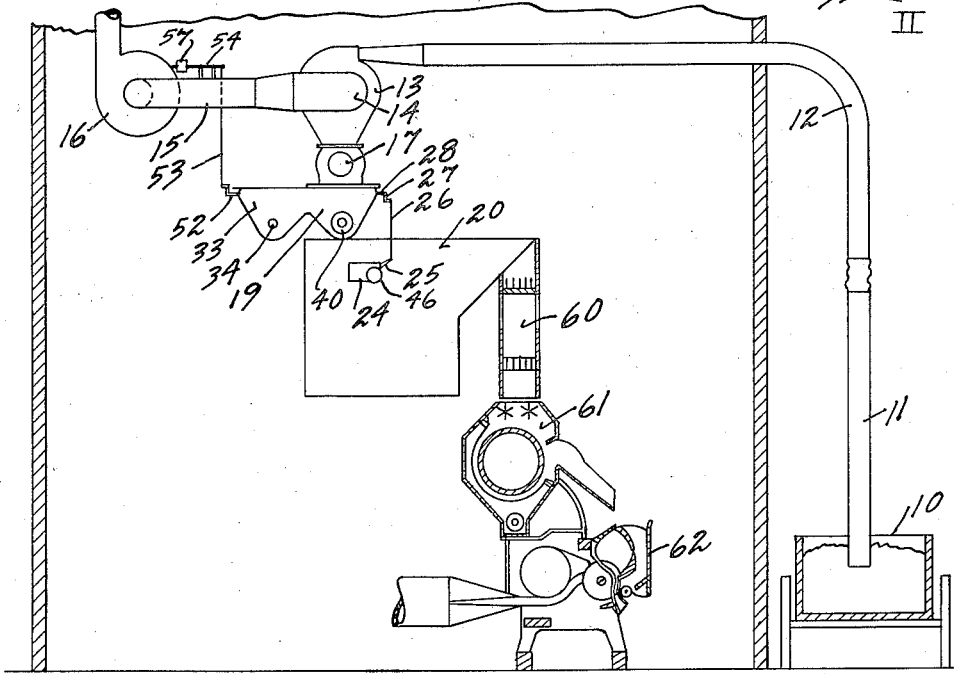
Inventor
Clyde E. Hagler Nov. 10, 1936.  C. E. HAGLER  2,060,305
MECHANISM FOR THE CONTROL OF FEED TO COTTON EXTRACTORS
Filed Oct. 6, 1934    2 Sheets-Sheet 2
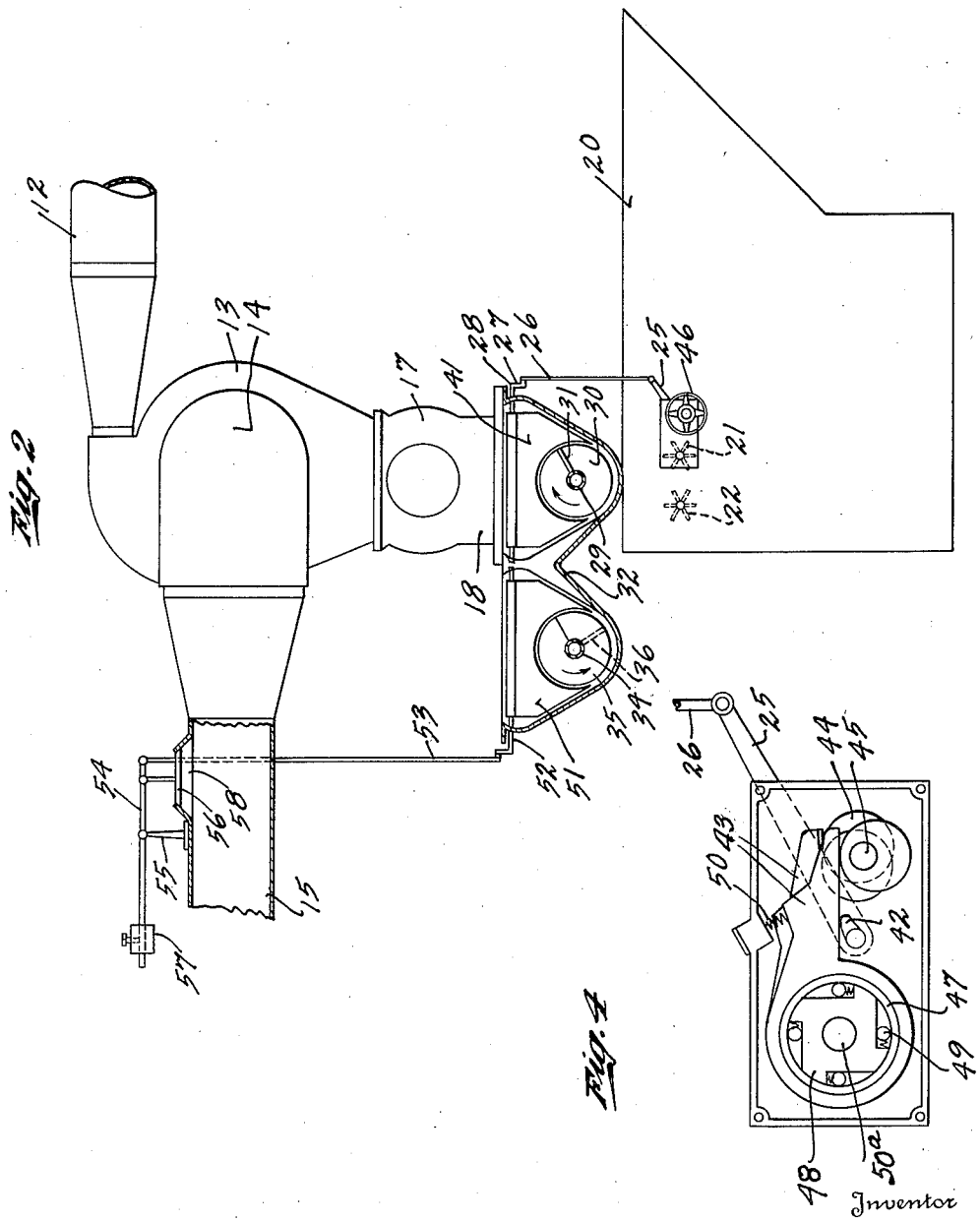
Inventor
Clyde E. Hagler
By Johnston & Jennings
Attorneys Patented Nov. 10, 1936

2,060,305

UNITED STATES PATENT OFFICE 2,060,305

MECHANISM FOR THE CONTROL OF FEED TO COTTON EXTRACTORS

Clyde E. Hagler, Birmingham, Ala., assignor to Continental Gin Company, a corporation of Delaware Application October 6, 1934, Serial No. 747,112

11 Claims. (Cl. 19—69)

My invention relates to mechanism designed to accomplish automatically a control of the feed of seed cotton and the like to an extractor or cleaner means for the removal of foreign matter therefrom.

It is the present general practice to utilize a pneumatic elevator for conveying seed cotton from the wagons, in which it is brought to the gin, to the distributor from which it is delivered to the several cotton gins, a suitable provision being made for an overflow at the distributor so that when there is an excessive feed of cotton from the wagons beyond the capacity of the gins to handle, such excess can pass off as an overflow and be later returned to the conveyor system.

Where the cotton carries an excessive amount of burrs, bolls, trash and like foreign matter, it is desirable to pass it through a preliminary cleaning mechanism such as is commonly known in the trade as a big burr extractor and which is adapted to treat the cotton passing therethrough so as to remove therefrom a large part of its foreign matter and deliver it sufficiently clean to the standard distributor over the gins so that any remaining foreign matter can be readily removed by the gins or by their cleaner feeders.

In a companion application, filed the 4th day of September, 1934, I have shown and described such a big burr extractor mechanism provided with a variable-speed drive for its feed rolls so that the rate of feed of cotton and accompanying foreign matter thereto can be regulated and controlled, the treatment mechanism within the extractor being of such character that it can with efficiency treat the cotton notwithstanding a substantial variation in its volumetric flow therethrough. Provision was made so that the rate of feed to the extractor would respond automatically to the presence of an excessive supply of cotton thereto and be so increased that the extractor could rapidly absorb and eliminate the excess.

In my present invention I propose to care for any excessive supply of cotton, that may result from irregularities in the feed at the wagon to the pneumatic elevator system, or otherwise, by the provision of a by-pass means ahead of the feed to the big burr extractor or equivalent preliminary treating mechanism for the cotton stream. This by-pass is to be distinguished from the existing by-passes in that it does not discharge the excess of cotton so that it will have to be collected and restored to the elevator system, but contemplates that temporary excessive supplies will be shunted through a by-pass and returned directly to the feed into the extractor or the like and I propose to utilize mechanism which will so respond automatically to the delivery of excessive cotton into such by-pass that the rate of feed of cotton to the extractor will be accelerated or the action of the pneumatic elevator will be modified or interrupted, or both such agencies may be simultaneously employed to eliminate the surplus cotton before it will choke up the apparatus.

More particularly, my invention contemplates delivering the entire feed of cotton from the wagons to a distributor for supplying it to the feed rolls that regulate its delivery into the big burr extractor or the like, and associating with said distributor a by-pass having conveyor means therein adapted to receive any overflow from the discharge end of said distributor and return it to the latter's intake end with control means interposed in the path of such overflow cotton and moved thereby to speed up the drive of the feed rolls for the extractor, or to open a valve in the suction for the pneumatic conveyor system to interrupt the feed from the wagon, or to accomplish both of these ends at the same time.

My invention also contemplates that the control means that respond to the overflow shall also act automatically, when the overflow of cotton has been eliminated, to restore the normal feed both to the extractor and the pneumatic elevator.

My invention further comprises the novel details of construction and arrangements of parts which in their preferred embodiment only are illustrated in the accompanying drawings which form a part of this specification, and in which:—

Fig. 1 illustrates in outline a pneumatic elevator for supplying seed cotton through a big burr extractor and distributor to a battery of gins.

Fig. 2 is an enlarged end view of the preliminary extractor showing the distributor and overflow mechanism in a cross section taken on the line II—II of Fig. 3.

Fig. 3 is a plan view somewhat enlarged of my improved distributor and its overflow by-pass means, with the feed inlet from the separator shown in cross section.

Fig. 4 is a detail view with the cover removed of the variable speed drive for controlling the rate of feed to the extractor.

Similar reference numerals refer to similar parts throughout the drawings.

In the embodiment of my invention illustrated in the drawings, I show conventionally a wagon 10 from which seed cotton and accompanying foreign matter is elevated by a pneumatic suction conveyor system, which comprises a flexible intake pipe 11 at the wagon which delivers the seed cotton to a duct 12 from whence it is discharged tangentially into the separator 13 wherein the seed cotton and accompanying foreign matter are separated from the air stream which passes out through end pipes 14 and duct 15 to a suction fan 16.

The seed cotton is preferably discharged from the separator 13 by a vacuum feeder 17 having its discharge 18 over the left hand end (Fig. 3) of a distributor trough 19 which extends lengthwise over the full width of the casing for the preliminary treatment mechanism, which may be a big burr extractor, a preliminary cleaner, or the like.

The extractor is preferably provided with feed rolls 21, 22 indicated in dotted lines, Fig. 2, which also extend the full width of its casing and throughout their length receive a feed of seed cotton through opening 23 that extends along that intermediate portion of the bottom of distributor trough 19 which overlies the extractor casing.

A variable speed drive is provided for the feed rolls 21 and 22 of the extractor. These rolls are geared together at one end and are adapted to be driven at a variable speed by means of a drive box 24 having a control arm 25 which is operable by rod 26 connected to a crank 27 on the outer end of a shaft 28 which is journaled overhead across the distributor trough 19 at or close to the right hand end of its cotton discharge opening 23.

By reference to Fig. 3 it will be noted that the distributor trough 19 at each end overhangs substantially beyond the extractor casing 20 and has suitable bearings in its end walls for a shaft 29 which carries a screw conveyor 30 which extends from the end of the trough nearest the separator beyond the crank 27 where the helicoid screw blade merges into a straight radial flipper blade 31, the purpose of which is to throw any overflow cotton passing beyond the distributor opening 23 over a V-shaped separator 32 into the receiving end of the by-pass trough 33 co-extensive and parallel with the distributor trough 19.

I provide in the by-pass trough 33 a screw conveyor element, similar to that in the distributor, and comprising the shaft 34, screw conveyor 35 and flipper blade 36, this shaft however being reversely disposed to the shaft 29 so that its flipper 36 stands opposite the overhung intake end of the distributor trough 19 beyond the feed inlet 18, where it acts to return cotton over a V-shaped separator 37 into the distributor trough in advance of the feed of seed cotton thereinto from the separator.

Both shafts 29 and 34 extend at one end beyond their respective troughs, which are closed at their ends, and there receive the meshing gears 38 and 39, shaft 29 at its other end carrying a pulley 40 having suitable drive means, not shown, which will so operate these conveyors as to effect a feed of any excess of seed cotton in trough 19 from its discharge end back through the overflow trough 33 to the intake end of the distributor trough.

A valve, or movable baffle, 41 is mounted fast on the crank shaft 28 and depends into trough 19, as clearly shown in Fig. 2, having its lower end shaped to fit loosely across the trough and to clear the conveyor blade. This valve is interposed across the conveyor trough 19 just beyond the right hand end of its discharge opening 23 so that when any excess of cotton collects at this point, beyond the capacity of the underlying feed rolls 21, 22 to deliver into the extractor 20, it will be forced by the screw against the valve and will swing it up rocking its crank and moving the control arm 25 to increase the rate of drive of said feed rolls in the manner which will now be described.

The arm 25 is journaled in the drive box 24 and carries a cam 42 which is disposed to engage a series of drive arms 43 which each overhang one of a series of cams or eccentrics 44 mounted on a shaft 45 driven by a pulley 46 from the extractor drive. The several drive arms carry ring bearings 47 which surround a clutch hub element 48 having longitudinal notches for spring pressed rollers 49. Springs 50 press the drive arms against eccentrics until their down travel is arrested by the cam 42. As the eccentrics successively raise the drive arms the latter act as roller clutches to drive the shaft 50a of the feed roll 21 which in turn drives roll 22. The angular play allowed the drive arms determines the rate of speed of the drive imparted through the clutches to the feed rolls. Therefore, when the presence of excess cotton causes the valve 41 to be moved it lowers control arm 25, increases the stroke of the drive arms and speeds up the feed of cotton into the extractor, thus tending to relieve the excess by carrying it off more rapidly. This variable speed drive forms the subject matter of a companion application, Serial No. 742,564, and is not therefore separately claimed herein.

The rate of feed of seed cotton from the wagon may be too great to allow the excess accumulating in the distributor 19 to be accommodated by the by-pass until it can be carried off by the increased rate of feed to the extractor, and to protect against this contingency I provide near the left hand or discharge end of the by-pass trough 33, a second valve 51, similar to 41, hung from a crank shaft 52, the crank end of which is connected by a rod 53 to the adjacent end of a lever 54 pivoted on the stand 55 mounted on the suction pipe 15.

A suction relief valve 56 is suspended from the lever 54 and normally is held by a counterweight 57 on the lever in position to close a relief port 58 in pipe 15. The counterweight is set so as just to overbalance the suction pull that tends to open valve 56. When any excess of cotton accumulates in trough 33 in quantity sufficient to actuate valve 51 the latter will pull the relief valve 56 open and cut off the suction action in the elevator system and hence the further supply of cotton to the distributor 19 until the excess is reduced sufficiently for valve 51 to swing back to normal vertical position and close the relief valve 56, whereupon the feed from the wagon will be automatically interrupted and restored as occasion may require.

The seed cotton, after treatment in the extractor to remove most of the burrs, hulls and trash therefrom, is discharged into the standard distributor 60, hence it is delivered either directly or through cleaner feeders 61 to the gins 62 of a battery.

In operation, the elevator system lifts seed cotton by suction from the wagon, separates it from the air current in the separator 13 and discharges it through the vacuum feeder 17 and chute 18 into the extractor distributor 19 where the screw conveyor carries it along the trough and distributes it substantially uniformly through the slot 23 onto the feed rolls of the extractor which pass the cotton in a stream of substantially uniform thickness across the full length of the extractor, the stream passing in contact with the various treatment devices within the extractor which clean it before it is delivered to the distributor 60 and thence to the gins. When the rate of feed from the wagon is excessive the conveyor 30 will drive the excess against valve 41, opening it and passing under it into the path of the flipper blade 31, which will throw it over into the by-pass trough 33 where the screw 35 will deliver it back to the flipper 36 which will return it to the intake end of the distributor trough 19.

A small amount of cotton may pass with the screw conveyors by the valves 41 and 51 without operating them as this small amount can be cared for in the by-pass, but if the excess is of substantial amount it will first trip valve 41 and increase the rate at which the feed rolls of the extractor will receive the cotton from the distributor 19 and this excess may also actuate valve 51, causing the relief valve in the suction line to open and stopping the feed from the wagon. As the valves 51 and 41 resume their normal position they will respectively restore the suction and the feed from the wagon and reduce the rate of feed to the extractor so that the normal functioning of the mechanism will be reestablished. All of this control is carried out without supervision and without necessity for handling any excess cotton that may make its appearance at the distributor 19.

It will of course be understood that the excess may be controlled solely by the manipulation of the relief valve 56, and my invention contemplates such a control used separately or in combination with the feed control to the extractor.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. In a conveyor system for seed cotton, a pneumatic elevator, a preliminary extractor for hulls, bolls and trash having a distributor fed by said elevator, means to feed the cotton from said distributor into the extractor, a variable speed drive for said extractor feed means, valve means to interrupt the pneumatic feed to said distributor, and means responsive to the overflow of cotton from said distributor to accelerate the rate of feed to the extractor and to slow up the feed to said distributor.

2. A mechanism according to claim 1, in which the normal feed to the extractor and distributor is rendered abnormal only during the existence of an overflow of cotton from the distributor.

3. In combination, an elevator for seed cotton, a preliminary extractor for bolls, hulls and trash having a distributor, fed by said pneumatic elevator, and feed rolls fed by said distributor, said distributor comprising a trough having a cotton outlet and conveyor means working over the outlet, an overflow by-pass connecting the ends of said distributor trough, conveyor means in said by-pass to return to the distributor cotton overflowing therefrom, baffle means interposed in the path of the overflow cotton and movable thereby, and means responsive to the displacement of the baffle means to reduce the feed of cotton from said elevator.

4. In combination, a pneumatic elevator for seed cotton, a preliminary extractor for bolls, hulls and trash having feed rolls and a distributor for supplying to said rolls cotton which is fed to the distributor by said elevator, said distributor comprising a trough having a cotton outlet and a conveyor means working over the outlet, an overflow by-pass connecting the ends of said distributor trough, conveyor means in said by-pass to return to the distributor cotton overflowing therefrom, baffles interposed in the path of said overflow cotton and movable thereby, and means controlled by said baffles to accelerate the rate of feed to the extractor and to decelerate the feed to said distributor.

5. The combination with a system for conveying seed cotton, of distributor means comprising parallel feeder and by-pass troughs adapted to have communication at their ends, reversely operating cotton conveyors working in said troughs and each comprising means to by-pass overflow cotton from the feeder to the by-pass trough and vice versa, means to deliver cotton from said feeder trough to treatment apparatus, and means operable by overflow cotton from said feeder trough to control the rate of supply of cotton thereto and its delivery therefrom into the treatment apparatus.

6. In combination, a cotton conveyor means, a distributor trough supplied by said conveyor means, a trough for by-passing overflow cotton from the discharge to the intake side of said distributor trough, screw conveyors reversely driven in said troughs, one acting to feed the entering cotton along the distributor trough and to discharge any overflow into the by-pass trough and the other to return said overflow through the by-pass trough back into the distributor trough, baffle means in the path of the overflow cotton and operable thereby, and means responsive to the operation of said baffle means to reduce the rate of feed of cotton to said distributor by said first mentioned conveyor means while the overflow condition prevails.

7. An apparatus according to claim 6, in which each screw conveyor carries a straight radial blade extending along it in position to flip the by-passing cotton from one to the other trough.

8. An apparatus according to claim 6, in which the baffle means consists of a vane hinged overhead and cut away to straddle the conveyor.

9. In combination, a pneumatic elevator, a distributor, an extractor for treating the stream of cotton supplied thereto by said elevator and distributor, feed means for the extractor supplied by its distributor, means responsive to an overflow of excess cotton at the distributor for modifying the rate of feed both to accelerate it to the extractor and decelerate it to its distributor so as to tend to relieve said excess, and means to effect the return of said overflow of cotton to the extractor distributor.

10. In combination, a pneumatic elevator for seed cotton, a conveyor distributor supplied by said elevator, a controller in said distributor conveyor movable responsive to the cotton overflow therefrom, a machine for treating the cotton having a variable speed drive, means responsive to said controller to accelerate said drive, a return conveyor distributor, means to deliver overflow cotton from the conveyor distributor to the return conveyor distributor, controller means responsive to the presence of overflow cotton in said return conveyor, and means responsive to said latter controller for decreasing the volume of cotton supplied by the pneumatic elevator to the distributor mechanism.

11. In combination, a pneumatic elevator, a distributor, an extractor for treating the stream of cotton supplied thereto by said elevator and distributor, feed means for the extractor supplied by its distributor, and means responsive to an overflow of excess cotton at the distributor for modifying the rate of feed both to accelerate it to the extractor and decelerate it to its distributor so as to tend to relieve said excess.

CLYDE E. HAGLER.